United States Patent
He et al.

(10) Patent No.: US 9,618,388 B2
(45) Date of Patent: Apr. 11, 2017

(54) ADJUSTMENT CIRCUIT AND METHOD FOR MEASURING OPTICAL PARAMETER AND OPTICAL MEASUREMENT SYSTEM

(71) Applicant: SHENZHEN CHINA STAR OPTOELECTRONICS TECHNOLOGY CO., LTD., Shenzhen, Guangdong (CN)

(72) Inventors: Jian He, Shenzhen (CN); Shen-Sian Syu, Shenzhen (CN); Yugang Bao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 227 days.

(21) Appl. No.: 14/406,255

(22) PCT Filed: Oct. 17, 2014

(86) PCT No.: PCT/CN2014/088807
§ 371 (c)(1),
(2) Date: Dec. 8, 2014

(87) PCT Pub. No.: WO2016/049949
PCT Pub. Date: Apr. 7, 2016

(65) Prior Publication Data
US 2016/0265967 A1     Sep. 15, 2016

(30) Foreign Application Priority Data

Sep. 29, 2014 (CN) .......................... 2014 1 0513600

(51) Int. Cl.
*H03F 3/08* (2006.01)
*G01J 1/44* (2006.01)
*G01M 11/02* (2006.01)

(52) U.S. Cl.
CPC ............... *G01J 1/44* (2013.01); *G01M 11/02* (2013.01); *G01J 2001/444* (2013.01)

(58) Field of Classification Search
CPC .............................. G01J 1/44; G01J 2001/444
(Continued)

(56) References Cited

U.S. PATENT DOCUMENTS 4,255,654 A    3/1981  Suzuki et al.
5,206,174 A *  4/1993  Gehrke .................. G01T 1/366
                                                    250/253
(Continued)

FOREIGN PATENT DOCUMENTS

CN    2762440 Y      3/2006
CN    201476877 U    5/2010
CN    103474011 A    12/2013

*Primary Examiner* — Thanh Luu
(74) *Attorney, Agent, or Firm* — Sughrue Mion, PLLC

(57) ABSTRACT

An adjustment circuit for measuring an optical parameter is disclosed. The adjustment circuit includes an optical sensing module for detecting an optical signal and converting the detected optical signal into a voltage signal; an amplification module for amplifying the voltage signal; an A/D conversion module for converting the amplified voltage signal into a digital signal; a control module for analyzing the digital signal for generating an analyzed result; a signal generating module for outputting a frequency square wave signal according to the analyzed result; and an adjustment module for adjusting an amplification factor of the amplification module according to the frequency square wave signal. The circuit of the present disclosure is easy, and an automatic measurement can be implemented.

6 Claims, 6 Drawing Sheets

(58) Field of Classification Search
USPC ..................................... 250/214 A, 214 AG
See application file for complete search history.

(56) References Cited

U.S. PATENT DOCUMENTS

| | | | | |
|---|---|---|---|---|
| 2009/0141177 A1* | 6/2009 | Chang | ...................... | H04N 5/52 348/678 |
| 2013/0277576 A1* | 10/2013 | Tinsley | ..................... | G01J 1/46 250/459.1 |
| 2014/0341397 A1* | 11/2014 | Straeussnigg | ........ | H03G 1/0017 381/120 |

* cited by examiner

ADJUSTMENT CIRCUIT AND METHOD FOR MEASURING OPTICAL PARAMETER AND OPTICAL MEASUREMENT SYSTEM

CROSS REFERENCE TO RELATED APPLICATIONS

This application is a National Stage of International Application No. PCT/CN2014/088807 filed Oct. 17, 2014, claiming priority based on Chinese Patent Application No. 201410513600.8, filed Sep. 29, 2014, the contents of all of which are incorporated herein by reference in their entirety.

BACKGROUND OF THE INVENTION

1. Field of the Invention

The present invention generally relates to a technical field of measuring an optical parameter, and more particularly to an adjustment circuit and a method for measuring an optical parameter and an optical measurement system.

2. Description of Prior Art

An optical measurement system which is widely used in a flat panel display field mainly implements to measure an optical parameter. One most common parameter is a brightness value. In practice, since a range change of a brightness value is large, a measurement range cannot meet practical requirements. Accordingly, plural measurement ranges are required in the optical measurement system.

In the prior art, adjusting an amplification factor of an amplification module is capable of implementing the plural measurement ranges. As shown in FIG. 1, an optical measurement system comprises an optical sensing module 11, an amplification module 12, and A/D conversion module 13, a control module 14, and an adjustment module 15. The adjustment module 15 comprises a first resistor R0, a plurality of adjustment resistors R1-RN, and a plurality of switches K1-KN. Each one of the adjustment resistors R1-RN is connected to one of the switches K1-KN in series, and the adjustment resistors R1-RN are connected in parallel. In FIG. 1, the switches K1-KN are manually turned on or turned off. The amplification factor is controlled by switching the switches K1-KN. However, a number of the measurement ranges in FIG. 1 is fixed, and thus a continuous change cannot be measured. Furthermore, when the number of the measurement ranges is increased, circuits are complicated, such that simplified circuits cannot be implemented. Moreover, since the switches K1-KN are manually turned on or turned off, an automatic measurement cannot be achieved.

Consequently, there is a need to provide a new technical scheme for solving the above-mentioned problems in the prior art.

SUMMARY OF THE INVENTION

An objective of the present invention is to provide an adjustment circuit and method for measuring an optical parameter and an optical measurement system which aim to solve the problems in the prior art that a number of the measurement ranges is fixed, a continuous change cannot be measured, circuits are complicated and simplified circuits cannot be implemented when the number of the measurement ranges is increased, and an automatic measurement cannot be achieved because the switches are manually turned on or turned off.

To solve the above-mentioned problems, a technical scheme of the present invention is described as follows. An adjustment circuit for measuring an optical parameter provided by the present invention comprises: an optical sensing module for detecting an optical signal and converting the detected optical signal into a voltage signal; an amplification module for amplifying the voltage signal; an A/D conversion module for converting the amplified voltage signal into a digital signal; a control module for analyzing the digital signal for generating an analyzed result; a signal generating module for outputting a frequency square wave signal according to the analyzed result; and an adjustment module for adjusting an amplification factor of the amplification module according to the frequency square wave signal. The control module analyzes the digital signal transmitted by the A/D conversion module and determines whether a current amplification factor is a best amplification factor. When it is determined that the current amplification factor is not the best amplification factor, the control module controls the signal generating module to output a corresponding frequency square wave signal, so as to control the adjustment module to adjust the amplification factor of the amplification module according to the corresponding frequency square wave signal. After the amplification factor of the amplification module is adjusted, the control module further determines whether the adjusted amplification factor is the best amplification factor. When it is determined that the adjusted amplification factor is not the best amplification factor, the control module further controls the signal generating module to output a corresponding frequency square wave signal, so as to control the adjustment module to adjust the amplification factor of the amplification module according to the frequency square wave signal. The above-mentioned determination steps are repeated until the control module determines that the current amplification factor is the best amplification factor and then outputted.

An adjustment circuit for measuring an optical parameter provided by the present invention comprises: an optical sensing module for detecting an optical signal and converting the detected optical signal into a voltage signal; an amplification module for amplifying the voltage signal; an A/D conversion module for converting the amplified voltage signal into a digital signal; a control module for analyzing the digital signal for generating an analyzed result; a signal generating module for outputting a frequency square wave signal according to the analyzed result; and an adjustment module for adjusting an amplification factor of the amplification module according to the frequency square wave signal.

Preferably, a first input end of the amplification module is electrically connected to the optical sensing module. A first end of the adjustment module is electrically connected to a ground end, and a second end of the adjustment module is electrically connected to a second input end of the amplification module. A first end of the A/D conversion module is electrically connected to an output end of the amplification module, and the first end of the A/D conversion module is further electrically connected to a third end of the adjustment module. The control module is electrically connected to a second end of the A/D conversion module. A first end of the signal generating module is electrically connected to the control module, and a second end of the signal generating module is electrically connected to a fourth end of the adjustment module.

Preferably, the adjustment module comprises an adjustment resistor, an adjustment capacitor, and a control switch. A first end of the adjustment resistor is electrically connected to the ground end, and a second end of the adjustment resistor is electrically connected to the second input end of the amplification module. A first end of the adjustment capacitor is electrically connected to the second end of the adjustment resistor. A first end of the control switch is electrically connected to a second end of the adjustment capacitor. A second end of the control switch is electrically connected to the first end of the A/D conversion module and the output end of the amplification module. A third end of the control switch is electrically connected to the second end of the signal generating module.

Preferably, the adjustment module comprises an adjustment resistor, an adjustment inductor, and a control switch. A first end of the adjustment resistor is electrically connected to the ground end, and a second end of the adjustment resistor is electrically connected to the second input end of the amplification module. A first end of the adjustment inductor electrically connected to the second end of the adjustment resistor. A first end of the control switch is electrically connected to a second end of the adjustment inductor. A second end of the control switch is electrically connected to the first end of the A/D conversion module and the output end of the amplification module. A third end of the control switch is electrically connected to the second end of the signal generating module.

Preferably, the signal generating module outputs the corresponding frequency square wave signal to control the control switch to be turned on or turned off. An impedance value of the adjustment capacitor is adjusted according to the frequency square wave signal. The amplification factor of the amplification module is adjusted according to the impedance value and a resistance value of the adjustment resistor.

Preferably, the signal generating module outputs the corresponding frequency square wave signal to control the control switch to be turned on or turned off. An impedance value of the adjustment inductor is adjusted according to the frequency square wave signal. The amplification factor of the amplification module is adjusted according to the impedance value and a resistance value of the adjustment resistor.

An adjustment method for measuring an optical parameter provided by the present invention comprises: detecting an optical signal and converting the detected optical signal into a voltage signal; amplifying the voltage signal; converting the amplified voltage signal into a digital signal; analyzing the digital signal for generating an analyzed result; outputting a frequency square wave signal according to the analyzed result; and adjusting an amplification factor of an amplification module according to the frequency square wave signal.

Preferably, the step of adjusting the amplification factor of the amplification module according to the frequency square wave signal comprises: controlling a control switch to be turned on or turned off according to the frequency square wave signal; adjusting an impedance value of an adjustment capacitor according to the frequency square wave signal; and adjusting the amplification factor of the amplification module according to the impedance value and a resistance value of an adjustment resistor.

Preferably, the step of adjusting the amplification factor of the amplification module according to the frequency square wave signal comprises: controlling a control switch to be turned on or turned off according to the frequency square wave signal; adjusting an impedance value of an adjustment inductor according to the frequency square wave signal; and adjusting the amplification factor of the amplification module according to the impedance value and a resistance value of an adjustment resistor.

An optical measurement system provided by the present invention comprises the above-mentioned adjustment circuit for measuring the optical parameter.

Comparing with prior art, the present invention determines whether the current amplification factor is the best amplification factor with the control module. When it is determined that the current amplification factor is not the best amplification factor, the signal generating module outputs a corresponding frequency square wave signal, so as to control the control switch to be turned on or turned off. The impedance value of the adjustment capacitor or the adjustment inductor is adjusted according to the frequency square wave signal. The amplification factor of the amplification module is adjusted to the best amplification factor according to the impedance value and the resistance value of the adjustment resistor. As a result, a continuous change of a range or an amplification factor in an optical measurement system can be implemented by applying the reactance principle to the present invention, and the measurement accuracy can be increased. Comparing with the prior art, the circuit of the present invention is easier, and thus the cost is saved. Furthermore, an automatic measurement can be implemented.

For a better understanding of the aforementioned content of the present invention, preferable embodiments are illustrated in accordance with the attached figures for further explanation:

DETAILED DESCRIPTION OF THE INVENTION

The term "embodiment" in the specification refers to an implementation or an example of one or more of the inventions. Furthermore, as used in the description herein and throughout the claims that follow, the meaning of "a" includes plural reference unless the context clearly dictates otherwise.

Embodiment 1

Figure 1:
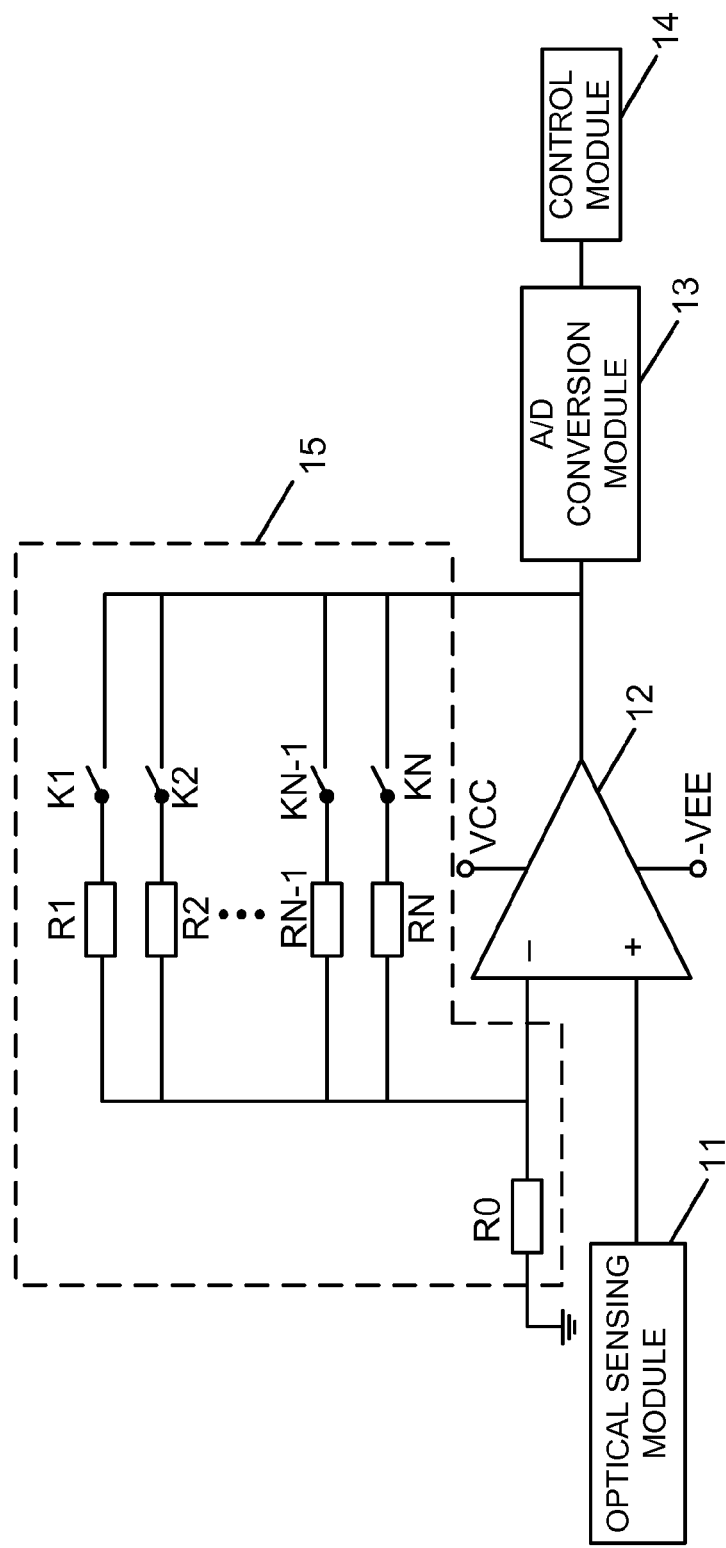
FIG. 1 shows a structural diagram of an adjustment circuit for measuring an optical parameter in the prior art.
Figure 2:
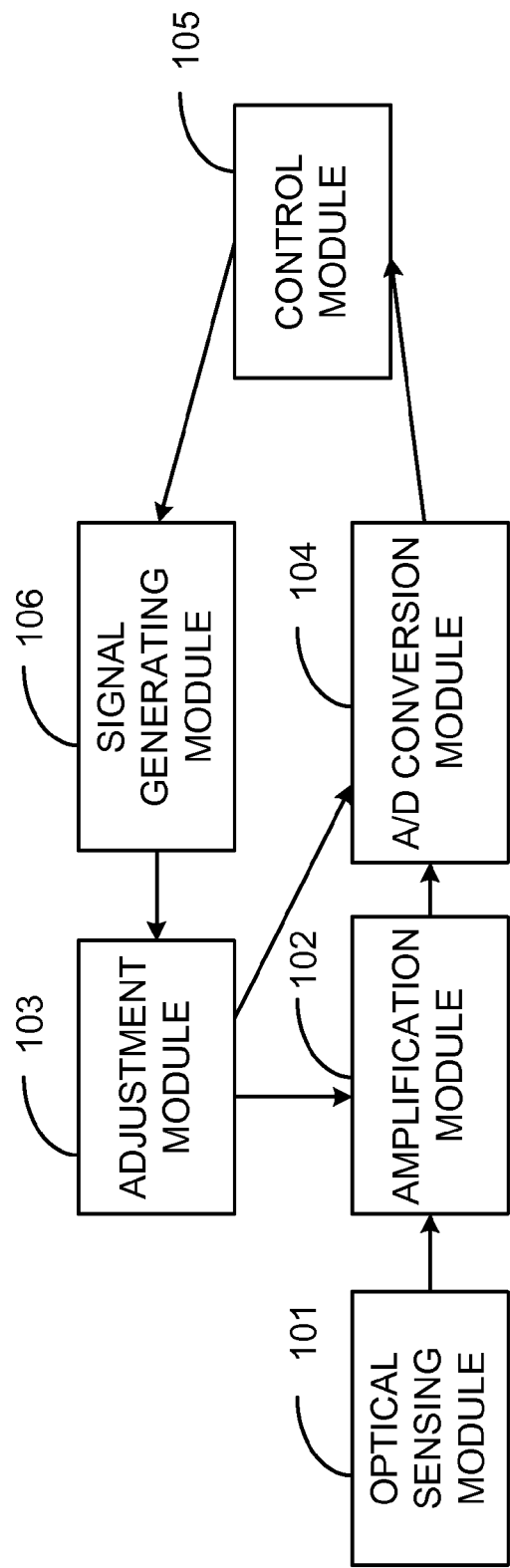
FIG. 2 shows a structural diagram of an adjustment circuit for measuring an optical parameter in accordance with a first embodiment of the present invention.

Please refer to FIG. 2. FIG. 2 shows a structural diagram of an adjustment circuit for measuring an optical parameter in accordance with a first embodiment of the present invention. For the sake of convenience, only parts corresponding to the present embodiment of the present invention are illustrated.

The adjustment circuit for measuring the optical parameter comprises an optical sensing module 101, an amplification module 102, an adjustment module 103, an A/D (analog-to-digital) conversion module 104, a control module 105, and a signal generating module 106. A first input end of the amplification module 102 is electrically connected to the optical sensing module 101. A first end of the adjustment module 103 is electrically connected to a ground end, and a second end of the adjustment module 103 is electrically connected to a second input end of the amplification module 102. A first end of the A/D conversion module 104 is electrically connected to an output end of the amplification module 102, and the first end of the A/D conversion module 104 is electrically connected to a third end of the adjustment module 103. The control module 105 is electrically connected to a second end of the A/D conversion module 104. A first end of the signal generating module 106 is electrically connected to the control module 105, and a second end of the signal generating module 106 is electrically connected to a fourth end of the adjustment module 103.

The optical sensing module 101 converts a detected optical signal into a voltage signal and outputs the voltage signal to the amplification module 102. The amplification module 102 amplifies the voltage signal and outputs the amplified voltage signal to the A/D conversion module 104. The A/D conversion module 104 converts the amplified voltage signal into a digital signal. The control module 105 analyzes the digital signal transmitted by the A/D conversion module 104 for generating an analyzed result and controls the signal generating module 106 to output a frequency square wave signal according to the analyzed result. The adjustment module 103 adjusts an amplification factor of the amplification module 102 according to the frequency square wave signal.

In the present embodiment of the present invention, the control module 105 analyzes the digital signal transmitted by the A/D conversion module 104 and determines whether a current amplification factor is a best amplification factor. When it is determined that the current amplification factor is not the best amplification factor, the control module 105 controls the signal generating module 106 to output a corresponding frequency square wave signal, so as to control the adjustment module 103 to adjust the amplification factor of the amplification module 102 according to the frequency square wave signal. After the amplification factor of the amplification module 102 is adjusted, the control module 105 further determines whether the adjusted amplification factor is the best amplification factor. When it is determined that the adjusted amplification factor is not the best amplification factor, the control module 105 further controls the signal generating module 106 to output a corresponding frequency square wave signal, so as to control the adjustment module 103 to adjust the amplification factor of the amplification module 102 according to the frequency square wave signal. The above-mentioned determination steps are repeated until the control module 105 determines that the current amplification factor is the best amplification factor and then outputted.

However, it can be appreciated that the optical sensing module 101 may be a photoelectric sensor. The control module 105 may be a micro control unit (MCU). The amplification module 102 and the adjustment module 103 may be built in an amplifier. The amplifier may be an operational amplifier. The A/D conversion module 104 may be an A/D converter. The A/D conversion module 104 may be integrated with the control module 105 as well.

It can be understood from the mentioned above that the adjustment circuit for measuring the optical parameter provided by the present embodiment determines whether the current amplification factor is the best amplification factor with the control module 105. When it is determined that the current amplification factor is not the best amplification factor, the control module 105 controls the signal generating module 106 to output a corresponding frequency square wave signal, so as to control the adjustment module 103 to adjust the amplification factor of the amplification module 102 to the best amplification factor according to the frequency square wave signal. As a result, a continuous change of a range or an amplification factor in an optical measurement system can be implemented in the present embodiment, and the measurement accuracy can be increased. Comparing with the prior art, the circuit in the present embodiment is easier, and thus the cost is saved. Furthermore, an automatic measurement can be implemented in the present embodiment.

Embodiment 2

Figure 3:
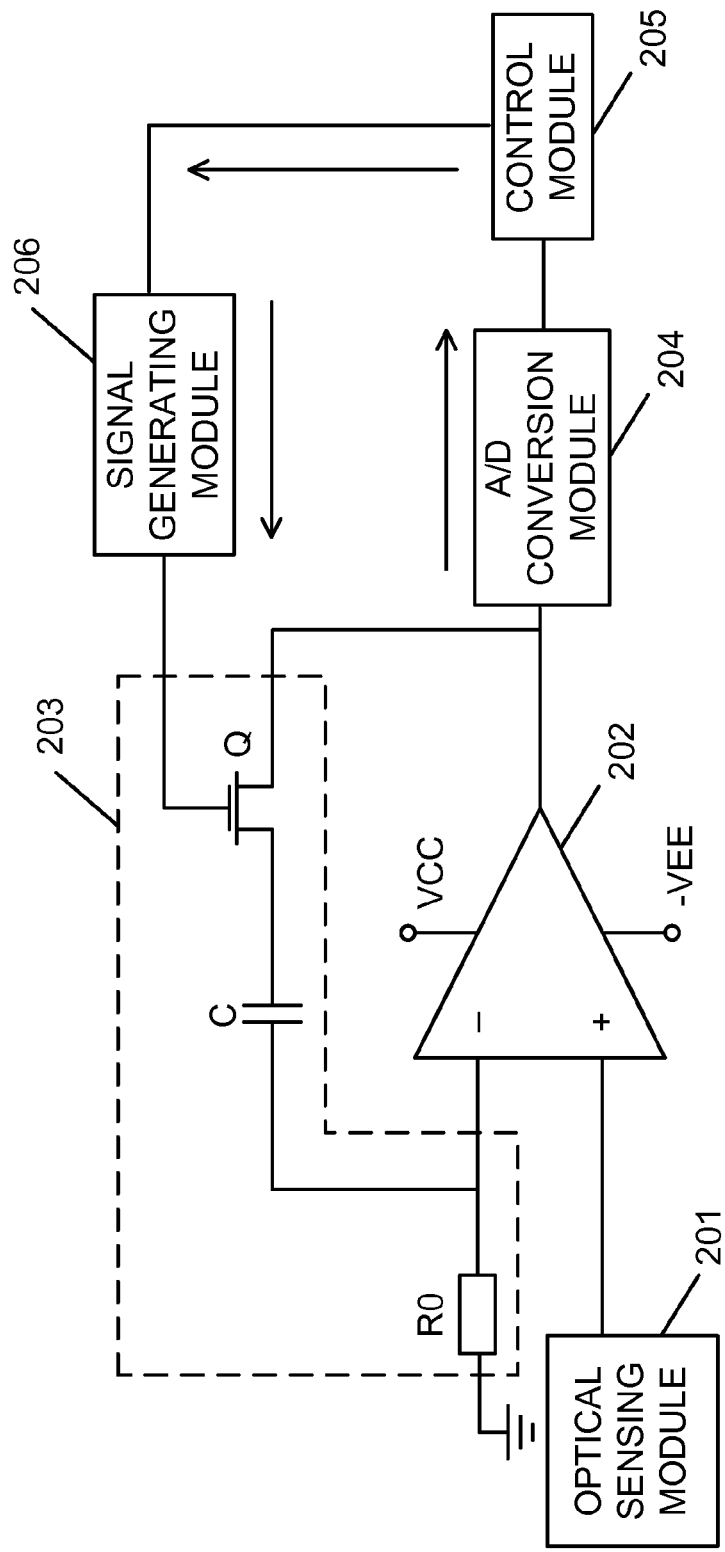
FIG. 3 shows a structural diagram of an adjustment circuit for measuring an optical parameter in accordance with a second embodiment of the present invention.

Please refer to FIG. 3. FIG. 3 shows a structural diagram of an adjustment circuit for measuring an optical parameter in accordance with a second embodiment of the present invention. For the sake of convenience, only parts corresponding to the present embodiment of the present invention are illustrated.

The adjustment circuit for measuring the optical parameter comprises an optical sensing module 201, an amplification module 202, an adjustment module 203, an A/D (analog-to-digital) conversion module 204, a control module 205, and a signal generating module 206. A first input end of the amplification module 202 is electrically connected to the optical sensing module 201. The adjustment module 203 comprises an adjustment resistor R0, an adjustment capacitor C, and a control switch Q. A first end of the adjustment resistor R0 is electrically connected to a ground end. A second end of the adjustment resistor R0 is electrically connected to a second input end of the amplification module 202. A first end of the adjustment capacitor C is electrically connected to the second end of the adjustment resistor R0. A first end of the control switch Q is electrically connected to a second end of the adjustment capacitor C. A second end of the control switch Q is electrically connected to an output end of the amplification module 202. A first end of the A/D conversion module 204 is electrically connected to the output end of the amplification module 202. The second end of the control switch Q is electrically connected to the first end of the A/D conversion module 204. The control module 205 is electrically connected to a second end of the A/D conversion module 204. A first end of the signal generating module 206 is electrically connected to the control module 205. A third end of the control switch Q is electrically connected to a second end of the signal generating module 206.

The optical sensing module 201 converts a detected optical signal into a voltage signal and outputs the voltage signal to the amplification module 202. The amplification module 202 amplifies the voltage signal and outputs the amplified voltage signal to the A/D conversion module 204. The A/D conversion module 204 converts the amplified voltage signal into a digital signal. The control module 205 analyzes the digital signal transmitted by the A/D conversion module 204 for generating an analyzed result and controls the signal generating module 206 to output a frequency square wave signal according to the analyzed result, so as to control the control switch Q to be turned on or turned off. An impedance value of the adjustment capacitor C is adjusted according to the frequency square wave signal. An amplification factor of the amplification module 202 is adjusted according to the impedance value and a resistance value of the adjustment resistor R0.

In the present embodiment of the present invention, the control module 205 analyzes the digital signal transmitted by the A/D conversion module 204 and determines whether a current amplification factor is a best amplification factor. When it is determined that the current amplification factor is not the best amplification factor, the control module 205 controls the signal generating module 206 to output a corresponding frequency square wave signal, so as to control the control switch Q to be turned on. The impedance value of the adjustment capacitor C is adjusted according to the frequency square wave signal. The amplification factor of the amplification module 202 is adjusted according to the impedance value and the resistance value of the adjustment resistor R0. After the amplification factor of the amplification module 202 is adjusted, the control module 205 further determines whether the adjusted amplification factor is the best amplification factor. When it is determined that the adjusted amplification factor is not the best amplification factor, the control module 205 further controls the signal generating module 206 to output a corresponding frequency square wave signal, so as to control the control switch Q to be turned on. The impedance value of the adjustment capacitor C is adjusted according to the frequency square wave signal. The amplification factor of the amplification module 202 is adjusted according to the impedance value and the resistance value of the adjustment resistor R0. The above-mentioned determination steps are repeated until the control module 205 determines that the current amplification factor is the best amplification factor and then outputted. The control module 205 controls the signal generating module 206 to output a corresponding frequency square wave signal for controlling the control switch Q to be turned off.

It can be understood from the mentioned above that the adjustment circuit for measuring the optical parameter provided by the present embodiment determines whether the current amplification factor is the best amplification factor with the control module 205. When it is determined that the current amplification factor is not the best amplification factor, the control module 205 controls the signal generating module 206 to output a corresponding frequency square wave signal, so as to control the control switch Q to be turned on. The impedance value of the adjustment capacitor C is adjusted according to the frequency square wave signal. The amplification factor of the amplification module 202 is adjusted to the best amplification factor according to the impedance value and the resistance value of the adjustment resistor R0. When it is determined that the current amplification factor is the best amplification factor, the control module 205 controls the signal generating module 206 to output a corresponding frequency square wave signal, so as to control the control switch Q to be turned off. As a result, a continuous change of a range or an amplification factor in an optical measurement system can be implemented by applying the capacitive reactance principle to the present embodiment, and the measurement accuracy can be increased. Comparing with the prior art, the circuit in the present embodiment is easier, and thus the cost is saved. Furthermore, an automatic measurement can be implemented in the present embodiment.

Embodiment 3

Figure 4:
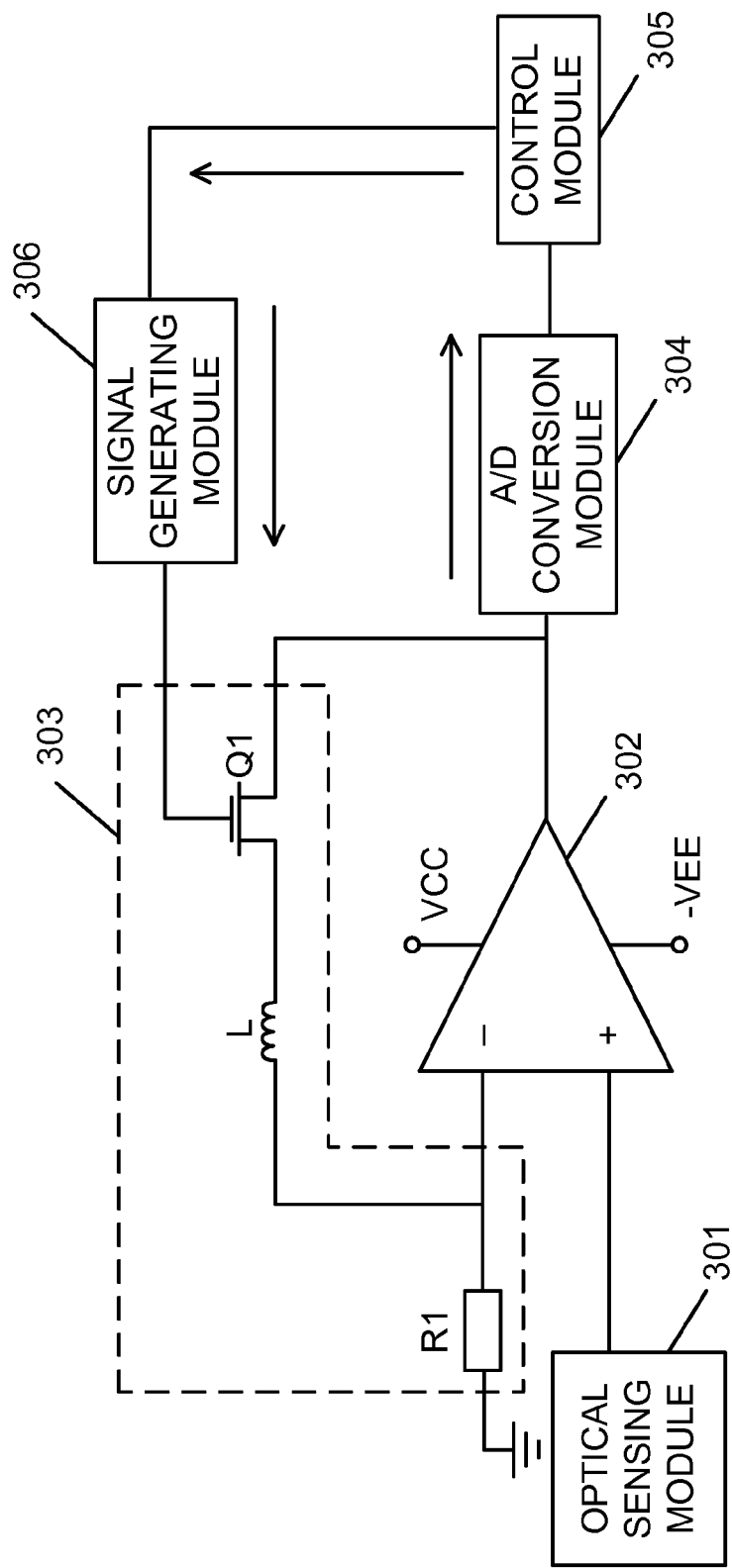
FIG. 4 shows a structural diagram of an adjustment circuit for measuring an optical parameter in accordance with a third embodiment of the present invention.

Please refer to FIG. 4. FIG. 4 shows a structural diagram of an adjustment circuit for measuring an optical parameter in accordance with a third embodiment of the present invention. For the sake of convenience, only parts corresponding to the present embodiment of the present invention are illustrated.

The adjustment circuit for measuring the optical parameter comprises an optical sensing module 301, an amplification module 302, an adjustment module 303, an A/D (analog-to-digital) conversion module 304, a control module 305, and a signal generating module 306. A first input end of the amplification module 302 is electrically connected to the optical sensing module 301. The adjustment module 303 comprises an adjustment resistor R1, an adjustment inductor L, and a control switch Q1. A first end of the adjustment resistor R1 is electrically connected to a ground end. A second end of the adjustment resistor R1 is electrically connected to a second input end of the amplification module 302. A first end of the adjustment inductor L is electrically connected to the second end of the adjustment resistor R1. A first end of the control switch Q1 is electrically connected to a second end of the adjustment inductor L. A second end of the control switch Q1 is electrically connected to an output end of the amplification module 302. A first end of the A/D conversion module 304 is electrically connected to the output end of the amplification module 302. The second end of the control switch Q1 is electrically connected to the first end of the A/D conversion module 304. The control module 305 is electrically connected to a second end of the A/D conversion module 304. A first end of the signal generating module 306 is electrically connected to the control module 305. A third end of the control switch Q1 is electrically connected to a second end of the signal generating module 306.

The optical sensing module 301 converts a detected optical signal into a voltage signal and outputs the voltage signal to the amplification module 302. The amplification module 302 amplifies the voltage signal and outputs the amplified voltage signal to the A/D conversion module 304. The A/D conversion module 304 converts the amplified voltage signal into a digital signal. The control module 305 analyzes the digital signal transmitted by the A/D conversion module 304 for generating an analyzed result and controls the signal generating module 306 to output a frequency square wave signal according to the analyzed result, so as to control the control switch Q1 to be turned on or turned off. An impedance value of the adjustment inductor L is adjusted according to the frequency square wave signal. An amplification factor of the amplification module 302 is adjusted according to the impedance value and a resistance value of the adjustment resistor R1.

In the present embodiment of the present invention, the control module 305 analyzes the digital signal transmitted by the A/D conversion module 304 and determines whether a current amplification factor is a best amplification factor. When it is determined that the current amplification factor is not the best amplification factor, the control module 305 controls the signal generating module 306 to output a corresponding frequency square wave signal, so as to control the control switch Q1 to be turned on. The impedance value of the adjustment inductor L is adjusted according to the frequency square wave signal. The amplification factor of the amplification module 302 is adjusted according to the impedance value and the resistance value of the adjustment resistor R1. After the amplification factor of the amplification module 302 is adjusted, the control module 305 further determines whether the adjusted amplification factor is the best amplification factor. When it is determined that the adjusted amplification factor is not the best amplification factor, the control module 305 further controls the signal generating module 306 to output a corresponding frequency square wave signal, so as to control the control switch Q1 to be turned on. The impedance value of the adjustment inductor L is adjusted according to the frequency square wave signal. The amplification factor of the amplification module 302 is adjusted according to the impedance value and the resistance value of the adjustment resistor R1. The above-mentioned determination steps are repeated until the control module 305 determines that the current amplification factor is the best amplification factor and then outputted. The control module 305 controls the signal generating module 306 to output a corresponding frequency square wave signal for controlling the control switch Q1 to be turned off.

It can be understood from the mentioned above that the adjustment circuit for measuring the optical parameter provided by the present embodiment determines whether the current amplification factor is the best amplification factor with the control module 305. When it is determined that the current amplification factor is not the best amplification factor, the control module 305 controls the signal generating module 306 to output a corresponding frequency square wave signal, so as to control the control switch Q1 to be turned on. The impedance value of the adjustment inductor L is adjusted according to the frequency square wave signal. The amplification factor of the amplification module 302 is adjusted to the best amplification factor according to the impedance value and the resistance value of the adjustment resistor R1. When it is determined that the current amplification factor is the best amplification factor, the control module 305 controls the signal generating module 306 to output a corresponding frequency square wave signal, so as to control the control switch Q1 to be turned off. As a result, a continuous change of a range or an amplification factor in an optical measurement system can be implemented by applying the inductive reactance principle to the present embodiment, and the measurement accuracy can be increased. Comparing with the prior art, the circuit in the present embodiment is easier, and thus the cost is saved. Furthermore, an automatic measurement can be implemented.

Figure 5:
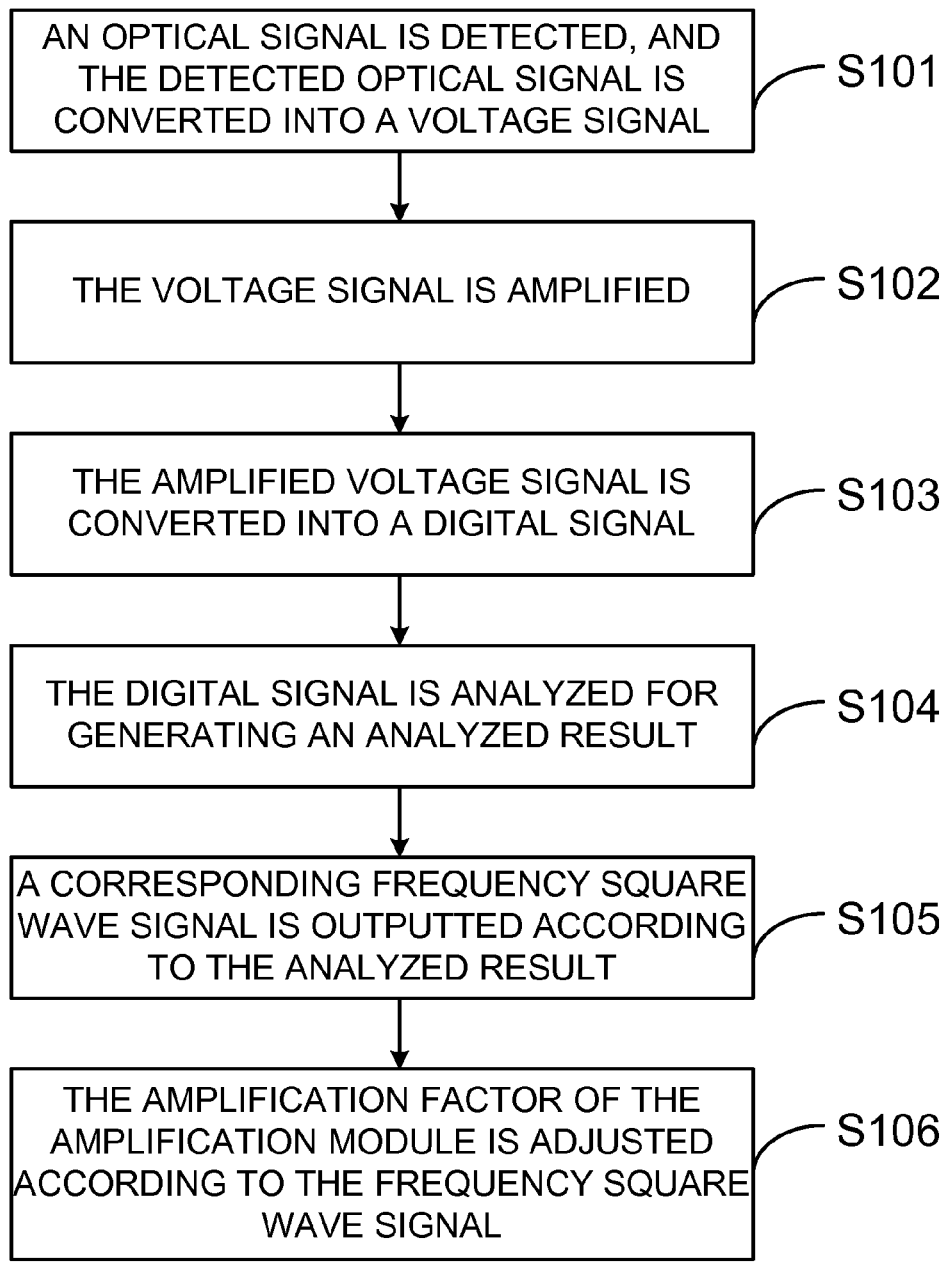
FIG. 5 shows a flowchart of an adjustment method for measuring an optical parameter in accordance with an embodiment of the present invention.

Please refer to FIG. 5. FIG. 5 shows a flowchart of an adjustment method for measuring an optical parameter in accordance with an embodiment of the present invention.

The adjustment method for measuring the optical parameter comprises the following steps.

In step S101, an optical signal is detected, and the detected optical signal is converted into a voltage signal.

In step S102, the voltage signal is amplified.

In step S103, the amplified voltage signal is converted into a digital signal.

In step S104, the digital signal is analyzed for generating an analyzed result.

In the present embodiment of the present invention, the control module (e.g. a microcontroller unit (MCU)) is utilized for analyzing the digital signal, and a correspondence table between brightness values and best amplification factors is stored in the control module. The control module analyzes the digital signal and determines whether an amplification factor corresponding to a current brightness is a best amplification factor according to the correspondence table. When it is determined that the amplification factor is not the best amplification factor, a corresponding frequency square wave signal is outputted and the amplification factor of the amplification module is adjusted according to the frequency square wave signal. After the amplification factor of the amplification module is adjusted, the control module further determines whether the adjusted amplification factor is the best amplification factor. When it is determined that the adjusted amplification factor is not the best amplification factor, a corresponding frequency square wave signal is outputted and the amplification factor of the amplification module is adjusted according to the frequency square wave signal. The above-mentioned determination steps are repeated until the control module determines that the current amplification factor is the best amplification factor and then outputted.

In Step 105, a corresponding frequency square wave signal is outputted according to the analyzed result.

In Step S106, the amplification factor of the amplification module is adjusted according to the frequency square wave signal.

Figure 6:
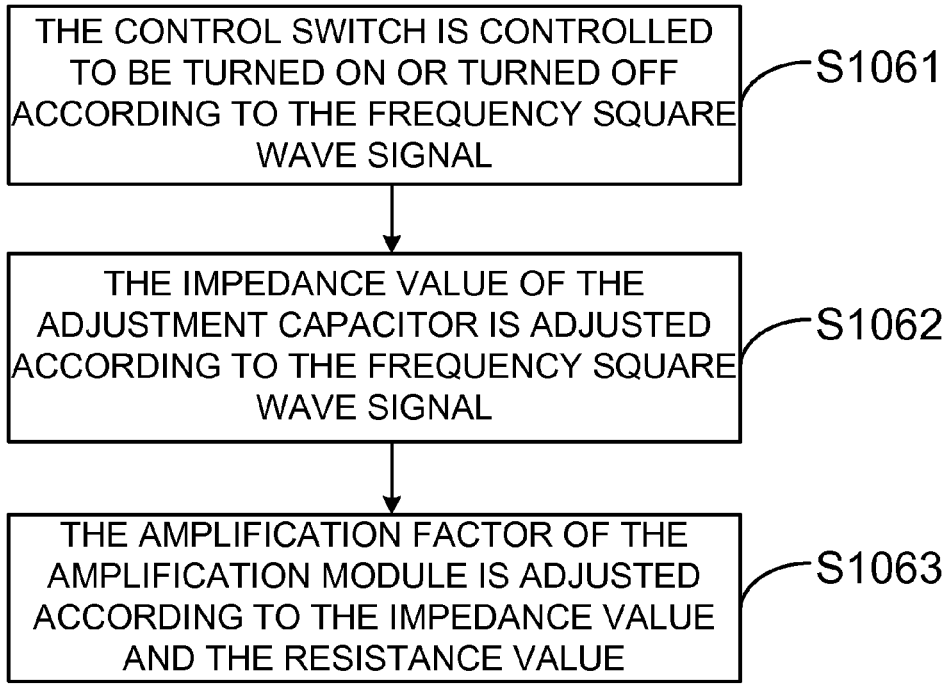
FIG. 6 shows a flowchart for adjusting the amplification factor of the amplification module in accordance with an embodiment of the present invention.

Please refer to FIG. 6. The Step S106 comprises the following steps in an embodiment of the present invention.

In Step S1061, the control switch is controlled to be turned on or turned off according to the frequency square wave signal.

In Step S1062, the impedance value of the adjustment capacitor is adjusted according to the frequency square wave signal.

In the present embodiment of the present invention, the impedance value of the adjustment capacitor is calculated as follows:

$$X_C = 1/(2\pi f C).$$

$X_C$ is the impedance value of the adjustment capacitor, and its unit is ohm. F is a frequency value of the square wave signal, and its unit is hertz (Hz). C is a capacitance value, and its unit is farad.

In Step S1063, the amplification factor of the amplification module is adjusted according to the impedance value and the resistance value of the adjustment resistor.

In the present embodiment of the present invention, the amplification factor is calculated as follows:

$$A = 1 + X_C/R0.$$

A is the amplification factor. $X_C$ is the impedance value of the adjustment capacitor, and its unit is ohm. R0 is the resistance value of the adjustment resistor, and its unit is ohm.

Figure 7:
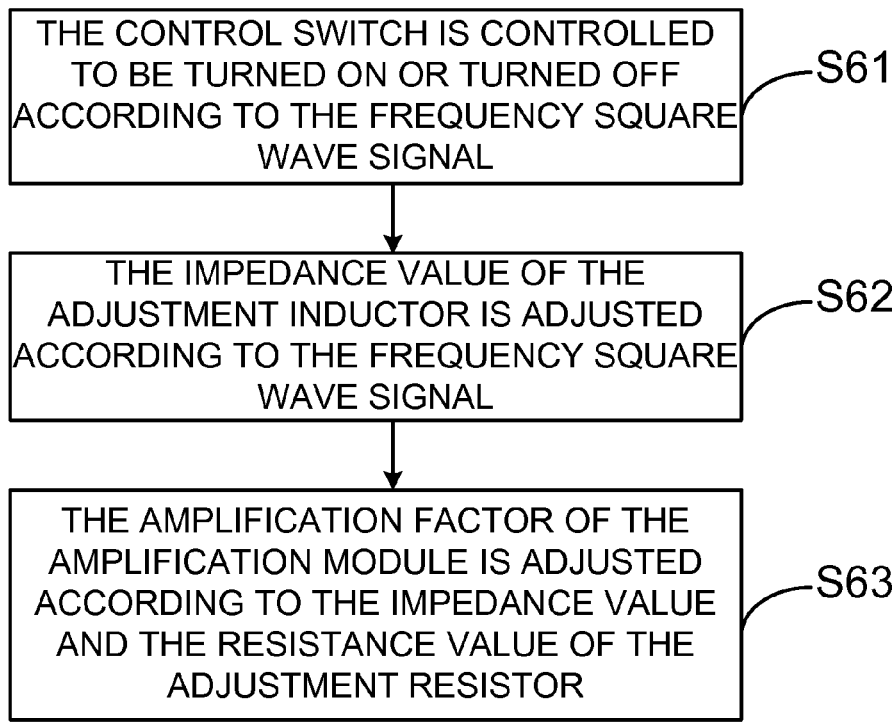
FIG. 7 shows a flowchart for adjusting the amplification factor of the amplification module in accordance with another embodiment of the present invention.

Please refer to FIG. 7. The Step S106 comprises the following steps in another embodiment of the present invention.

In Step S61, the control switch is controlled to be turned on or turned off according to the frequency square wave signal.

In Step S62, the impedance value of the adjustment inductor is adjusted according to the frequency square wave signal.

In the present embodiment of the present invention, the impedance value of the adjustment inductor is calculated as follows:

$$X_L = 2\pi f L.$$

$X_L$ is the impedance value of the adjustment inductor, and its unit is ohm. F is a frequency value of the square wave signal, and its unit is Hz. L is an inductance value, and its unit is henry.

In Step S63, the amplification factor of the amplification module is adjusted according to the impedance value and the resistance value of the adjustment resistor.

In the present embodiment of the present invention, the amplification factor is calculated as follows:

$$A = 1 + X_L/R1.$$

A is the amplification factor. $X_L$ is the impedance value of the adjustment inductor, and its unit is ohm. R1 is a resistance value of the adjustment resistor, and its unit is ohm.

It can be understood from the mentioned above that the adjustment method for measuring the optical parameter provided by the present embodiment determines whether the current amplification factor is the best amplification factor. When it is determined that the current amplification factor is not the best amplification factor, a corresponding frequency square wave signal is outputted, so as to adjust the amplification factor of the amplification module to the best amplification factor. As a result, a continuous change of a range or an amplification factor in an optical measurement system and an adaptive adjustment in different brightness levels of environments can be implemented in the present embodiment, and the measurement accuracy can be increased. Comparing with the prior art, an automatic measurement can be implemented.

An embodiment of the present invention further provides an optical measurement system. The optical measurement system comprises the adjustment circuit for measuring the optical parameter described above. The structure of the adjustment circuit for measuring the optical parameter is described in detail above, and thus it is not repeated herein.

In summary, the adjustment circuit and the method for measuring the optical parameter and the optical measurement system provided by the embodiments determine whether the current amplification factor is the best amplification factor with the control module. When it is determined that the current amplification factor is not the best amplification factor, the control module controls the signal generating module to output a corresponding frequency square wave signal, so as to control the control switch to be turned on or turned off. The impedance value of the adjustment capacitor or the adjustment inductor is adjusted according to the frequency square wave signal. The amplification factor of the amplification module is adjusted to the best amplification factor according to the impedance value and the resistance value of the adjustment resistor. As a result, a continuous change of a range or an amplification factor in an optical measurement system can be implemented by applying the reactance principle to the present invention, and the measurement accuracy can be increased. Comparing with the prior art, the circuit of the present invention is easier, and thus the cost is saved. Furthermore, an automatic measurement can be implemented.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. An adjustment circuit for measuring an optical parameter, the adjustment circuit comprising:
    an optical sensing module for detecting an optical signal and converting the detected optical signal into a voltage signal;
    an amplification module for amplifying the voltage signal;
    an A/D conversion module for converting the amplified voltage signal into a digital signal;
    a control module for analyzing the digital signal for generating an analyzed result;
    a signal generating module for outputting a frequency square wave signal according to the analyzed result; and
    an adjustment module for adjusting an amplification factor of the amplification module according to the frequency square wave signal,
    wherein a first input end of the amplification module is electrically connected to the optical sensing module;
    a first end of the adjustment module is electrically connected to a ground end, and a second end of the adjustment module is electrically connected to a second input end of the amplification module;
    a first end of the A/D conversion module is electrically connected to an output end of the amplification module, and the first end of the A/D conversion module is further electrically connected to a third end of the adjustment module;
    the control module is electrically connected to a second end of the A/D conversion module; and
    a first end of the signal generating module is electrically connected to the control module, and a second end of the signal generating module is electrically connected to a fourth end of the adjustment module,
    wherein the adjustment module comprises:
    an adjustment resistor, a first end of the adjustment resistor electrically connected to the ground end, and a second end of the adjustment resistor electrically connected to the second input end of the amplification module;
    an adjustment inductor, a first end of the adjustment inductor electrically connected to the second end of the adjustment resistor; and
    a control switch, a first end of the control switch electrically connected to a second end of the adjustment inductor, a second end of the control switch electrically connected to the first end of the A/D conversion module and the output end of the amplification module, and a third end of the control switch electrically connected to the second end of the signal generating module.

2. The adjustment circuit for measuring the optical parameter of claim 1, wherein the signal generating module outputs the frequency square wave signal to control the control switch to be turned on or turned off;
an impedance value of the adjustment capacitor is adjusted according to the frequency square wave signal; and
the amplification factor of the amplification module is adjusted according to the impedance value and a resistance value of the adjustment resistor.

3. An adjustment circuit for measuring an optical parameter, the adjustment circuit comprising:
an optical sensing module for detecting an optical signal and converting the detected optical signal into a voltage signal;
an amplification module for amplifying the voltage signal;
an A/D conversion module for converting the amplified voltage signal into a digital signal;
a control module for analyzing the digital signal for generating an analyzed result;
a signal generating module for outputting a frequency square wave signal according to the analyzed result; and
an adjustment module for adjusting an amplification factor of the amplification module according to the frequency square wave signal,
wherein a first input end of the amplification module is electrically connected to the optical sensing module;
a first end of the adjustment module is electrically connected to a ground end, and a second end of the adjustment module is electrically connected to a second input end of the amplification module;
a first end of the A/D conversion module is electrically connected to an output end of the amplification module, and the first end of the A/D conversion module is further electrically connected to a third end of the adjustment module;
the control module is electrically connected to a second end of the A/D conversion module; and
a first end of the signal generating module is electrically connected to the control module, and a second end of the signal generating module is electrically connected to a fourth end of the adjustment module,
wherein the adjustment module comprises:
an adjustment resistor, a first end of the adjustment resistor electrically connected to the ground end, and a second end of the adjustment resistor electrically connected to the second input end of the amplification module;
an adjustment capacitor, a first end of the adjustment capacitor electrically connected to the second end of the adjustment resistor; and
a control switch, a first end of the control switch electrically connected to a second end of the adjustment capacitor, a second end of the control switch electrically connected to the first end of the A/D conversion module and the output end of the amplification module, and a third end of the control switch electrically connected to the second end of the signal generating module,
wherein the signal generating module outputs the frequency square wave signal to control the control switch to be turned on or turned off;
an impedance value of the adjustment capacitor is adjusted according to the frequency square wave signal; and
the amplification factor of the amplification module is adjusted according to the impedance value and a resistance value of the adjustment resistor.

4. An adjustment method for measuring an optical parameter, comprising:
detecting an optical signal and converting the detected optical signal into a voltage signal;
amplifying the voltage signal;
converting the amplified voltage signal into a digital signal;
analyzing the digital signal for generating an analyzed result;
outputting a frequency square wave signal according to the analyzed result; and
adjusting an amplification factor of an amplification module according to the frequency square wave signal,
wherein the step of adjusting the amplification factor of the amplification module according to the frequency square wave signal comprises:
controlling a control switch to be turned on or turned off according to the frequency square wave signal;
adjusting an impedance value of an adjustment capacitor according to the frequency square wave signal; and
adjusting the amplification factor of the amplification module according to the impedance value and a resistance value of an adjustment resistor.

5. An adjustment method for measuring an optical parameter, comprising:
detecting an optical signal and converting the detected optical signal into a voltage signal;
amplifying the voltage signal;
converting the amplified voltage signal into a digital signal;
analyzing the digital signal for generating an analyzed result;
outputting a frequency square wave signal according to the analyzed result; and
adjusting an amplification factor of an amplification module according to the frequency square wave signal,
wherein the step of adjusting the amplification factor of the amplification module according to the frequency square wave signal comprises:
controlling a control switch to be turned on or turned off according to the frequency square wave signal;
adjusting an impedance value of an adjustment inductor according to the frequency square wave signal; and
adjusting the amplification factor of the amplification module according to the impedance value and a resistance value of an adjustment resistor.

6. An optical measurement system, comprising an adjustment circuit for measuring an optical parameter, the adjustment circuit comprising:
an optical sensing module for detecting an optical signal and converting the detected optical signal into a voltage signal;
an amplification module for amplifying the voltage signal;
an A/D conversion module for converting the amplified voltage signal into a digital signal;
a control module for analyzing the digital signal for generating an analyzed result;
a signal generating module for outputting a frequency square wave signal according to the analyzed result; and
an adjustment module for adjusting an amplification factor of the amplification module according to the frequency square wave signal, wherein a first input end of the amplification module is electrically connected to the optical sensing module;

a first end of the adjustment module is electrically connected to a ground end, and a second end of the adjustment module is electrically connected to a second input end of the amplification module;

a first end of the A/D conversion module is electrically connected to an output end of the amplification module, and the first end of the A/D conversion module is further electrically connected to a third end of the adjustment module;

the control module is electrically connected to a second end of the A/D conversion module; and a first end of the signal generating module is electrically connected to the control module, and a second end of the signal generating module is electrically connected to a fourth end of the adjustment module, wherein the adjustment module comprises:

an adjustment resistor, a first end of the adjustment resistor electrically connected to the ground end, and a second end of the adjustment resistor electrically connected to the second input end of the amplification module;

an adjustment inductor, a first end of the adjustment inductor electrically connected to the second end of the adjustment resistor; and a control switch, a first end of the control switch electrically connected to a second end of the adjustment inductor, a second end of the control switch electrically connected to the first end of the A/D conversion module and the output end of the amplification module, and a third end of the control switch electrically connected to the second end of the signal generating module.

* * * * *